United States Patent
Ashihara et al.

(10) Patent No.: US 9,933,007 B2
(45) Date of Patent: Apr. 3, 2018

(54) SLIDING BEARING

(71) Applicants: TAIHO KOGYO CO., LTD., Toyota-shi, Aichi (JP); TOYOTA JIDOSHA KABUSHIKI KAISHA, Toyota-shi, Aichi (JP)

(72) Inventors: Katsuhiro Ashihara, Toyota (JP); Yuichiro Kajiki, Toyota (JP); Hiroki Takata, Toyota (JP); Akihiro Honda, Susono (JP); Motoichi Murakami, Gotenba (JP)

(73) Assignees: TAIHO KOGYO CO., LTD., Toyota-shi (JP); TOYOTA JIDOSHA KABUSHIKI KAISHA, Toyoto-shi (JP)

( * ) Notice: Subject to any disclaimer, the term of this patent is extended or adjusted under 35 U.S.C. 154(b) by 0 days.

(21) Appl. No.: 15/111,313

(22) PCT Filed: Jan. 13, 2015

(86) PCT No.: PCT/JP2015/050659
§ 371 (c)(1),
(2) Date: Jul. 13, 2016

(87) PCT Pub. No.: WO2015/108031
PCT Pub. Date: Jul. 23, 2015

(65) Prior Publication Data
US 2016/0333922 A1    Nov. 17, 2016

(30) Foreign Application Priority Data
Jan. 15, 2014    (JP) ................................. 2014-005349

(51) Int. Cl.
F16C 33/10    (2006.01)
F16C 9/02    (2006.01)

(52) U.S. Cl.
CPC ............ *F16C 9/02* (2013.01); *F16C 33/1065* (2013.01); *F16C 33/1095* (2013.01)

(58) Field of Classification Search
CPC .......... F16C 9/02; F16C 17/02; F16C 17/022; F16C 33/1065
See application file for complete search history.

(56) References Cited

U.S. PATENT DOCUMENTS 6,872,004 B2    3/2005    Mian et al.
8,979,378 B2    3/2015    Hikita et al.
(Continued)

FOREIGN PATENT DOCUMENTS

DE    102012210530 A1    12/2013
GB    2485807 A    5/2012
(Continued)

*Primary Examiner* — James Pilkington
(74) *Attorney, Agent, or Firm* — Andrews Kurth Kenyon LLP

(57) ABSTRACT

Provided is a sliding bearing that has a bearing inner peripheral surface covered by a resin overlay layer configured from a binder resin and a solid lubricant and/or hard substance, reduces the running-in time during an operation start, and can obtain the effect of increasing wear resistance and the effect of reducing friction. In the sliding bearing, halved members resulting from halving a cylinder parallel to the axial direction are disposed at the top and bottom, the inner peripheral surfaces of the top and bottom halved members are covered by a resin overlay layer configured from a binder resin and a solid lubricant and/or hard substance, and a fine groove is provided to an axial-direction end of the bottom halved member in the peripheral direction from the mating surface at the downstream side in the rotational direction to a predetermined bearing angle.

4 Claims, 2 Drawing Sheets

(56) References Cited

U.S. PATENT DOCUMENTS

| | | | |
|---|---|---|---|
| 9,657,769 B2* | 5/2017 | Ashihara | F16C 9/02 |
| 2004/0062458 A1 | 4/2004 | Mian et al. | |
| 2011/0268944 A1* | 11/2011 | Adam | F16C 9/00 |
| | | | 428/216 |
| 2013/0064486 A1 | 3/2013 | Ishigo | |
| 2013/0108195 A1* | 5/2013 | Sun | F16C 33/1095 |
| | | | 384/26 |
| 2014/0248012 A1 | 9/2014 | Hikita et al. | |
| 2016/0102707 A1* | 4/2016 | Ashihara | F16C 17/022 |
| | | | 384/288 |
| 2016/0273577 A1* | 9/2016 | Ashihara | F16C 9/02 |
| 2016/0298676 A1* | 10/2016 | Ashihara | F16C 9/02 |

FOREIGN PATENT DOCUMENTS

| | | | |
|---|---|---|---|
| JP | H04-063810 U | | 5/1992 |
| JP | H08-33259 A | | 2/1996 |
| JP | H08121459 A | | 5/1996 |
| JP | H10-37962 A | | 2/1998 |
| JP | 2003-532036 A | | 10/2003 |
| JP | 2006-138353 A | | 6/2006 |
| JP | 2010196871 | * | 9/2010 |
| JP | 2013-194830 A | | 9/2013 |
| JP | 2014-159861 A | | 9/2014 |
| JP | 2014181811 | * | 9/2014 |
| JP | 2014224601 | * | 12/2014 |
| WO | 2012/069191 A1 | | 5/2012 |

* cited by examiner

SLIDING BEARING

CROSS-REFERENCE TO RELATED APPLICATIONS

This is a national phase application based on the PCT International Patent Application No. PCT/JP2015/050659 filed Jan. 13, 2015, claiming priority to Japanese Patent Application No. 2014-005349 filed Jan. 15, 2014, the entire contents of both of which are incorporated herein by reference.

TECHNICAL FIELD

The present invention relates to a technique of a sliding bearing, and to a technique of a sliding bearing including halved members on upper and lower sides, obtained by dividing a cylinder in two along an axial direction.

BACKGROUND ART

A conventional known sliding bearing, for axially supporting a crankshaft of an engine, has a halved structure in which two members, obtained by dividing a cylindrical shape in two, are combined (see, for example, Patent Literature 1). Furthermore, a conventionally known bearing has an inner circumference surface covered with a resin overlay layer including binder resin and any one of a solid lubricant and a hard material. With the inner circumference surface of the bearing covered by the resin overlay layer including the binder resin and any one of the solid lubricant and the hard material, friction due to contact between the bearing and the crankshaft can be reduced and thus wear resistance can be improved.

CITATION LIST

Patent Literature

PTL 1: Japanese Translation of PCT International Application Publication No. JP 2003-532036 A

SUMMARY OF INVENTION

Technical Problem

However, the inner circumference surface of the bearing covered by the resin overlay layer including the binder resin and any one of the solid lubricant and the hard material as in the conventional technique has lower conformability and thus involves a longer running-in time at the time of operation start. The effects of reducing the friction and improving the wear resistance through the covering with the resin overlay layer are only obtained in mixed and boundary lubrication regions and not obtained in a fluid lubricating region.

In view of the above problems, an object of the present invention is to provide a sliding bearing that has an inner circumference surface covered with a resin overlay layer including binder resin and at least one of a solid lubricant and a hard material, and can achieve a shorter running-in time at the time of operation start and can obtain effects of reducing friction and improving wear resistance.

Solution to Problem

Next, a solution to the problems to be solved by the present invention described above is described.

Specifically, according to claim 1, in a sliding bearing in which halved members, obtained by dividing a cylinder in two along an axial direction, are provided on upper and lower sides, and the halved members on the upper and lower sides each have an inner circumference surface covered with a resin overlay layer including binder resin and at least one of a solid lubricant and a hard material. The halved members have first and second mating end surfaces. Also, according to claim 1, a first groove and a second groove are provided only at an end portion on a downstream side of the halved member on the lower side that is one of end portions in an axial direction, and extend in a circumference direction from one of the mating surfaces on the downstream side in a rotation direction to a position corresponding to a predetermined bearing angle, wherein the distance from one end portion of the halved member on the lower side in the axial direction to the first groove and the distance from other end portion of the halved member on the lower side in the axial direction to the second groove are both shorter than the distance between the first groove and the second groove. In addition, according to claim 1, there are no grooves between the first groove and the second groove.

Advantageous Effects of Invention

The present invention provides the following effects.

Specifically, with the groove, a sliding area requiring a running-in process is reduced, whereby a running-in time at the time of operation start is shortened to quickly achieve a fluid lubrication operation. Further ore, with the sliding area reduced, effects of reducing friction and improving wear resistance can be obtained during the fluid lubrication operation.

DESCRIPTION OF EMBODIMENTS

Figure 1:
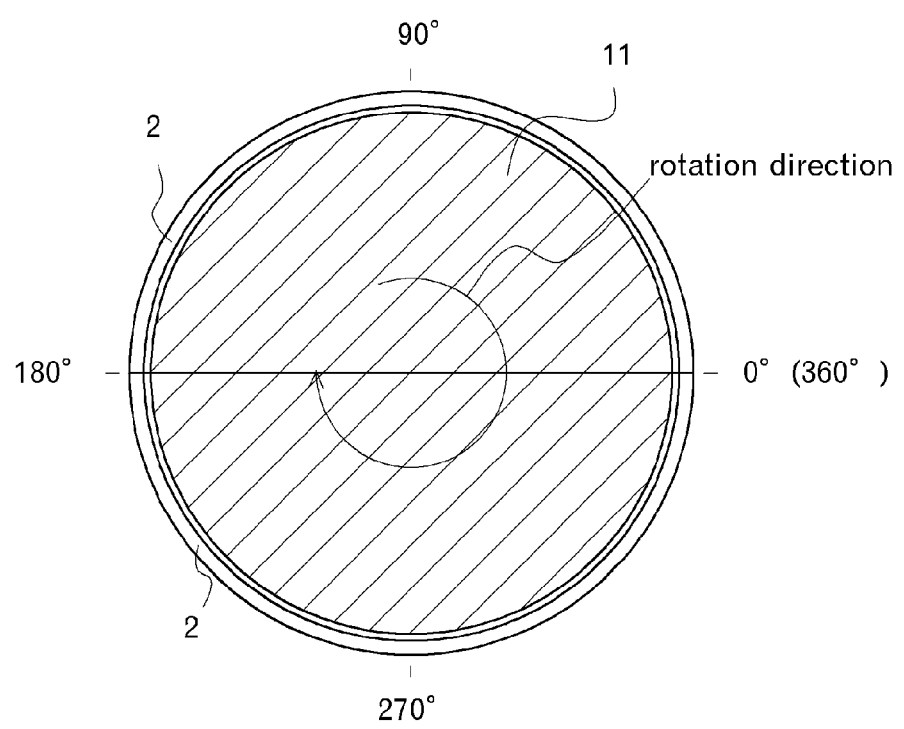
FIG. 1 is a front view of a sliding bearing according to one embodiment.

Next, an embodiment of the present invention is described, FIG. 1 is a front view of a sliding bearing 1 according to one embodiment of the present invention. An upper and lower direction, a front and rear direction, and a left and right direction of a sheet of FIG. 1 are respectively defined as an upper and lower direction, an axial direction (front and rear direction), and a left and right direction of the bearing 1.

Figure 2:
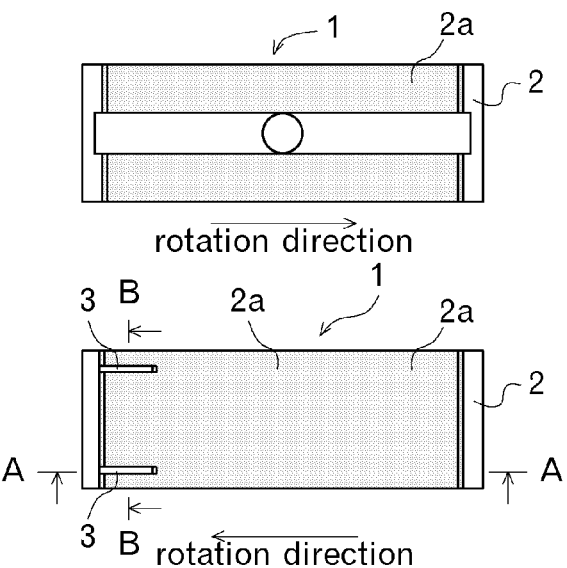
FIG. 2(*a*) is a plan view illustrating halved members of the sliding bearing according to one embodiment, FIG. 2(*b*) is a cross-sectional view of the same taken along line A-A, and FIG. 2(*c*) is a cross-sectional view of the same taken along B-B.
Figure 2:
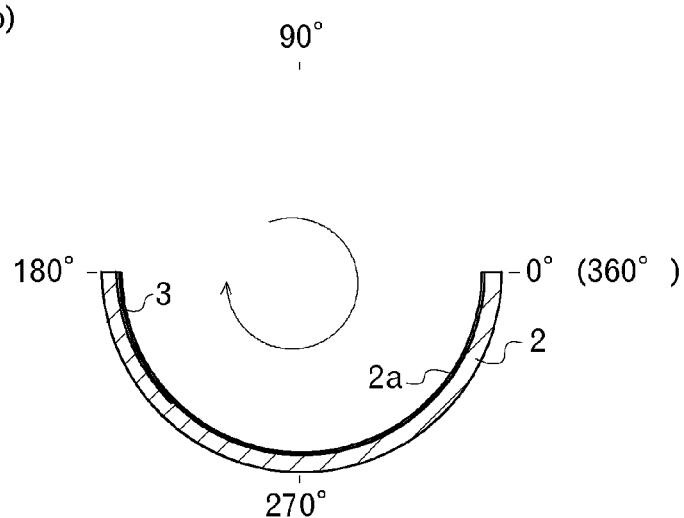
Figure 2:
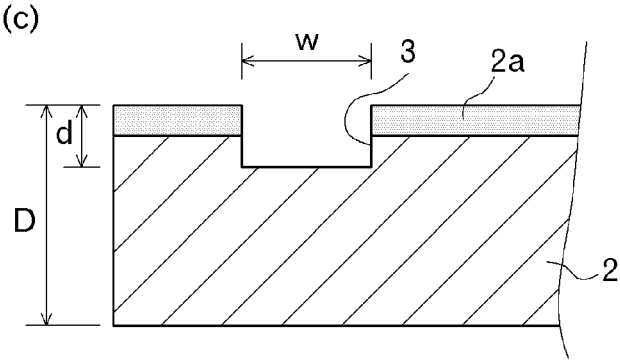

First of all, halved members 2 of the sliding bearing are described with reference to FIGS. 1 and 2.

The sliding bearing 1 is a cylindrical member, and is applied to a sliding bearing structure for a crankshaft 11 for an engine as illustrated in FIG. 1. The sliding bearing 1 includes two halved members 2 and 2. The two halved members 2 and 2 have shapes obtained by dividing a cylinder in two along the axial direction, and each have a semicircular cross section on a plane orthogonal to the front and rear direction. In the present embodiment, the halved members 2 and 2 are disposed on upper and lower sides, and have mating surfaces on left and right sides. When the crankshaft 11 is supported by the sliding bearing 1, a predetermined gap is formed to which lubricating oil is supplied from an unillustrated oil path.

FIG. 2(a) illustrates the halved members 2 on the upper and the lower sides. In the present embodiment, a rotation direction of the crankshaft 11 is a clockwise direction in a front view as illustrated with arrows in FIGS. 1, 2(a), and 2(b). A bearing angle is 0° at a right end position in FIG. 2(b) and increases in a counterclockwise direction in FIG. 2(b) to be 180° and 270° respectively at a left end position and a lower end position in FIG. 2(b).

As illustrated in FIG. 2(a) to FIG. 2(c), in the sliding bearing 1, the halved members 2 and 2 on the upper and the lower sides each have an inner circumference surface covered with a resin overlay layer 2a including binder resin and at least one of a solid lubricant and a hard material (a hatched portion in FIG. 2(a) to FIG. 2(c)). With the resin overlay layer 2a, the inner circumference surface of the sliding bearing 1 is prevented from being damaged, and involves less friction and wearing.

The binder resin serves as an adhesive layer with which at least one of the solid lubricant and the hard material tightly adheres to the halved members 2 and 2, and includes at least one of polyamide-imide (PAI) resin, polyimide resin, phenol resin, polyacetal resin, polyether-ether-ketone resin, and polyphenylene sulfide resin in the present embodiment.

The solid lubricant is a material that is applied to a frictional surface to reduce friction and wearing, and includes at least one of $MoS_2$, polytetrafluoroethylene (PTFE), graphite, $WS_2$, hexagonal boron nitride (h-BN), and $SB_2O_3$ in the present embodiment.

The hard material is a material that is applied to a frictional surface to reduce friction and wearing, and includes at least one of SiC, $AlO_3$, TiN, AlN, $CrO_2$, $Si_3N_4$, $ZrO_2$, and $Fe_3P$ in the present embodiment.

The resin overlay layer 2a may include the binder resin and the solid lubricant, include the binder resin and the hard material, or may include the binder resin and a composition of the solid lubricant and the hard material.

The halved member 2 on the upper side has an inner circumference provided with a groove in a circumference direction that has a round hole at the center, and has the mating surfaces on the left and the right sides. The resin overlay layer 2a is coated on a portion of the inner circumference surface of the halved member 2 on the upper side other than the grove, as illustrated in FIG. 2(a).

The halved member 2 on the lower side has an inner circumference surface provided with grooves 3 that are formed on one end portion in the axial direction and extend in a circumference direction in which the bearing angle increases (counterclockwise direction) from the mating surface on a downstream side in the rotation direction (where the bearing angle is 180°) The resin overlay layer 2a is coated on a portion of the inner circumference surface of the halved member 2 on the upper side other than the grooves 3.

The grooves 3 are provided to the halved member 2 on the lower side. In the present embodiment, two grooves 3 are arranged in parallel in the axial direction. More specifically, the grooves 3 extend along the circumference direction in a direction in which a bearing angle ω increases (in the counterclockwise direction) from the mating surface on the downstream side in the rotation direction of the crankshaft 11 (where the bearing angle ω is 180°). Thus, the halved member 2 on the lower side has the mating surface on the right side in FIG. 2(b) serving as a mating surface on an upstream side in the rotation direction, and has the mating surface on the left side in FIG. 2(b) serving as the mating surface on the downstream side in the rotation direction.

Each of the grooves 3 is formed to have a depth d smaller than a bearing width D, as illustrated in FIG. 2(c), and to have a width w.

With the grooves 3, a sliding area requiring the running-in process can be reduced, whereby a running-in time at the time of operation start is shortened to quickly achieve a fluid lubrication operation. With the grooves 3, the sliding area is reduced, and thus lower friction can be achieved.

With the grooves 3, pressure gradient in an end portion of the sliding bearing 1 in the axial direction can be changed. More specifically, by increasing the pressure gradient, corresponding to pressure dropping toward a center portion from a bearing end portion in the grooves 3, an oil retraction amount increases and thus the total amount of oil flowing out is reduced.

With the covering with the resin overlay layer 2a, reduction in load capacity and oil film thickness involved in the provision of the groove 3 can be prevented. More specifically, with the covering with the resin overlay layer 2a, the friction is reduced and the wear resistance is improved, compared with a configuration without the coating, so that the load capacity increases and the oil film thickness is maintained. Consequently, the reduction in load capacity and oil film thickness, involved in the provision of the grooves 3, can be prevented.

As described above, in the sliding bearing 1 in which the halved members 2 and 2, obtained by dividing a cylinder in two along an axial direction, are provided on upper and lower sides, and the halved members 2 on the upper and lower sides each have an inner circumference surface covered with the resin overlay layer 2a including binder resin and at least one of a solid lubricant and a hard material, the grooves 3 are provided at an end portion of the halved member 2 on the lower side in an axial direction, and extend in a circumference direction from a mating surface on a downstream side in a rotation direction to a position corresponding to a predetermined bearing angle.

With such a configuration in which the grooves 3 are provided, the sliding area requiring the running-in process is reduced, whereby a running-in time at the time of operation start is shortened to quickly achieve a fluid lubrication operation. Furthermore, with the sliding area reduced, effects of reducing friction and improving wear resistance can be obtained during the fluid lubrication operation.

REFERENCE SIGNS LIST

1 Sliding bearing
2 Halved member
2a Resin overlay layer
3 groove
11 Crankshaft

The invention claimed is:

1. A sliding bearing in which halved members, obtained by dividing a cylinder in two along an axial direction, are provide on an upper side and a lower side, and the halved members on the upper and lower sides each have an inner circumference surface covered with a resin overlay layer including binder resin and at least one of a solid lubricant and a hard material, and the halved members each having a first and a second mating end surface, wherein a first groove and a second groove are provided only at an end portion on a downstream side of the halved member on the lower side and extend in a circumference direction from one of the mating surfaces on the downstream side in a rotation direction to a position corresponding to a predetermined bearing angle, wherein a distance from an axial end of the halved member on the lower side in the axial direction to the first groove and a distance from another axial end of the halved member on the lower side in the axial direction to the second groove are both shorter than the distance between the first groove and the second groove, wherein there are no grooves between the first groove and the second groove, wherein the solid lubricant is a material that is applied to a frictional surface to reduce friction and wearing, and includes at least one of $MoS_2$, polytetrafluoroethylene (PTFE), graphite, $WS_2$, hexagonal boron nitride (h-BN), and $SB_2O_3$, and wherein the hard material is a material that is applied to a frictional surface to reduce friction and wearing, and includes at least one of SiC, $AlO_3$, TiN, AlN, $CrO_2$, $Si_3N_4$, $ZrO_2$, and $Fe_3P$.

2. The sliding bearing of claim 1, wherein the resin overlay layer includes the binder resin and a composition of the solid lubricant and the hard material.

3. A sliding bearing in which halved members, obtained by dividing a cylinder in two along an axial direction, are provide on an upper side and a lower side, and the halved members on the upper and lower sides each have an inner circumference surface covered with a resin overlay layer including binder resin and a solid lubricant, wherein a first groove and a second groove are provided only at an end portion on a downstream side of the halved member on the lower side and extend in a circumference direction from one of the mating surfaces on the downstream side in a rotation direction to a position corresponding to a predetermined bearing angle, wherein a distance from an axial end of the halved member on the lower side in the axial direction to the first groove and a distance from another axial end of the halved member on the lower side in the axial direction to the second groove are both shorter than the distance between the first groove and the second groove, wherein there are no grooves between the first groove and the second groove, and wherein the solid lubricant is a material that is applied to a frictional surface to reduce friction and wearing, and include at least one of one of $MoS_2$, polytetrafluoroethylene (PTFE), graphite, $WS_2$, hexagonal boron nitride (h-BN), and $SB_2O_3$.

4. A sliding bearing in which halved members, obtained by dividing a cylinder in two along an axial direction, are provide on an upper side and a lower side, and the halved members on the upper and lower sides each have an inner circumference surface covered with a resin overlay layer including binder resin and a hard material, wherein a first groove and a second groove are provided only at an end portion on a downstream side of the halved member on the lower side, and extend in a circumference direction from one of the mating surfaces on the downstream side in a rotation direction to a position corresponding to a predetermined bearing angle, wherein a distance from an axial end of the halved member on the lower side in the axial direction to the first groove and a distance from another axial end of the halved member on the lower side in the axial direction to the second groove are shorter than the distance between the first groove and the second groove, wherein there are no grooves between the first groove and the second groove, and wherein the hard material is a material that is applied to a frictional surface to reduce friction and wearing, and includes at least one of SiC, $AlO_3$, TiN, AlN, $CrO_2$, $Si_3N_4$, $ZrO_2$, and $Fe_3P$.

* * * * *